UNITED STATES PATENT OFFICE.

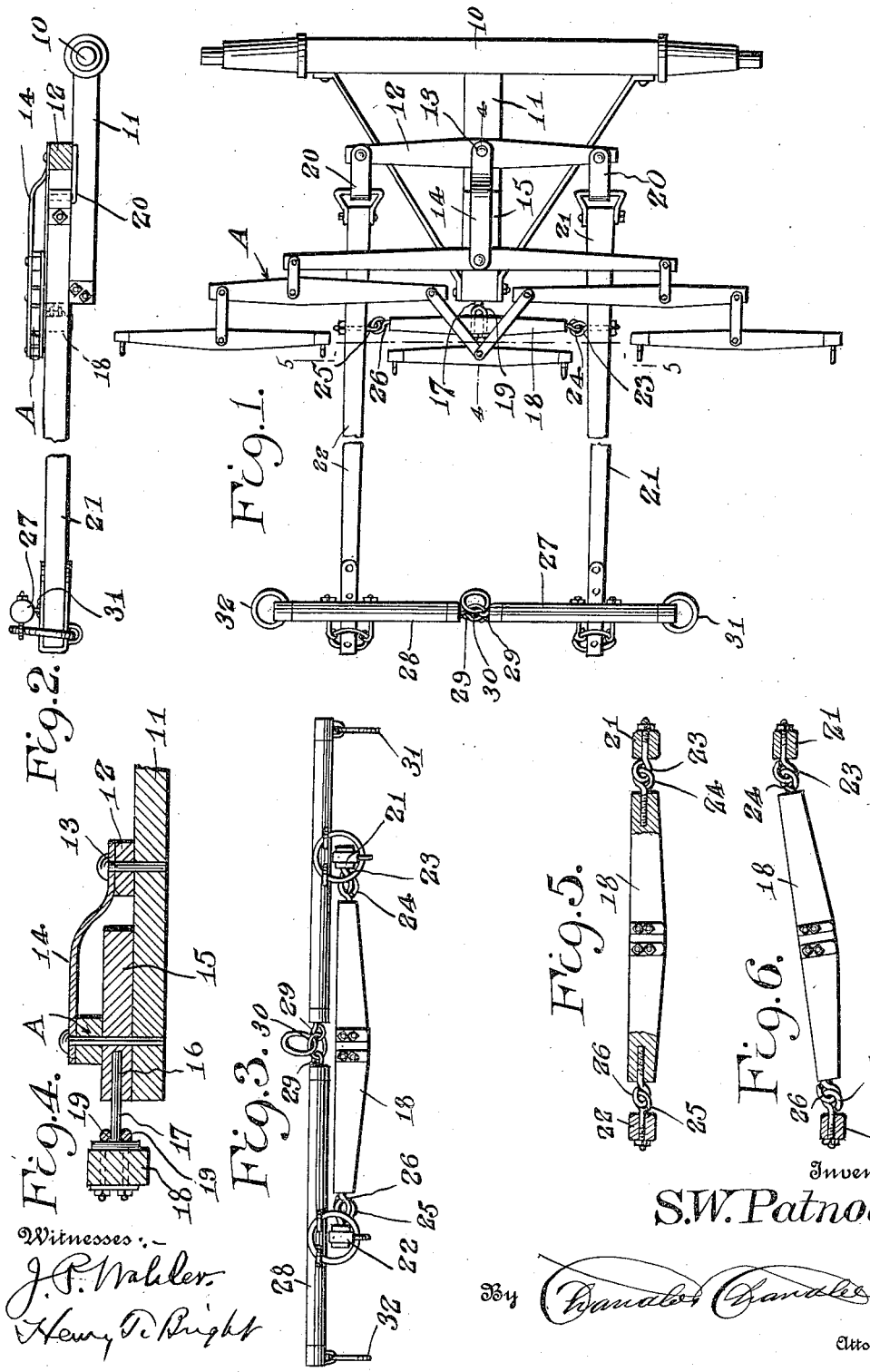

SAMUEL W. PATNODE, OF ELLENBURG CENTER, NEW YORK.

HOLDBACK-EQUALIZER.

1,052,618.  Specification of Letters Patent.  Patented Feb. 11, 1913.

Application filed May 15, 1912. Serial No. 697,455.

*To all whom it may concern:*

Be it known that I, SAMUEL W. PATNODE, a citizen of the United States, residing at Ellenburg Center, in the county of Clinton, State of New York, have invented certain new and useful Improvements in Holdback-Equalizers; and I do hereby declare the following to be a full, clear, and exact description of the invention, such as will enable others skilled in the art to which it appertains to make and use the same.

This invention relates to equalizers and particularly to a type adapted to equalize the load exerted upon the draft animals when the vehicle is going down hill and the draft animals are being held back to check the tendency of the vehicle to gain speed under the influence of gravity.

The object of the invention resides in the provision of an equalizer of the character referred to adapted for use in connection with a vehicle in which three draft animals are employed and which will efficiently cause the draft animals to hold back against the weight of the load with equal force so that each animal will perform the same amount of work under the conditions named.

With the above and other objects in view, the invention consists in the details of construction and in the arrangement and combination of parts to be hereinafter more fully described and particularly pointed out in the appended claim.

In describing the invention in detail, reference will be had to the accompanying drawings wherein like characters of reference denote corresponding parts in the several views, and in which—

Figure 1 is a plan view of the forward axle of a vehicle having the improved hold back equalizer associated therewith, Fig. 2, a side view of what is shown in Fig. 1 partly in section, Fig. 3, a front end view of what is shown in Fig. 1, Fig. 4, a section on the line 4—4 of Fig. 1, Fig. 5, a section on the line 5—5 of Fig. 1, and Fig. 6, a view similar to Fig. 5 showing the position of the parts when the poles have moved relatively to each other in a vertical plane.

Referring to the drawings 10 indicates the forward axle of a vehicle, and 11 a stub tongue projecting therefrom and secured thereto in the usual and well known manner. Pivotally mounted upon the stub tongue 11 adjacent its rear end is an evener beam 12, the pivot of said beam being central and effected by a pin 13 which secures in place the inner end of a reach strap 14. Mounted on the stub tongue 11 forward of the evener beam 12 is a block 15 upon which is mounted a three horse draft equalizer A of the usual and well known construction, the pivot pin of the evener bar of said equalizer A serving to secure the forward end of the reach strap 14 against movement. Formed in the outer end of the block 15 is a longitudinal recess 16 which rotatably receives the stem of a T-shaped member 17. The head of this T-shaped member 17 is secured to the central portion of a bar 18 by means of clamps 19. By this construction it will be apparent that the bar 18 is capable of rotation in both a vertical and horizontal plane. Secured to the terminals of the evener beam 12 are U-shaped members 20 with which are engaged the inner ends of poles 21 and 22 respectively, the connection between the poles 21 and 22 and the U-shaped members 20 being such that the free ends of said poles are adapted for movement up and down in a vertical plane. The pole 21 is linked to the adjacent end of the bar 18 by means of eye bolts 23 and 24 mounted respectively in said pole 21 and in the bar 18. Likewise the pole 22 is linked to the bar 18 by means of eye bolts 25 and 26 mounted respectively in the pole 22 and bar 18. Secured to the outer end of the pole 21 in the usual and well known manner is a neck yoke 27 two-thirds of whose length is disposed inwardly of the pole 21 and the remaining third outwardly of said pole. A corresponding neck yoke 28 is secured to the outer end of the pole 22 and has two thirds of its length disposed inwardly of the pole 22 and the remaining third disposed outwardly of said pole. Eye bolts 29 are secured in the adjacent ends of the neck yokes 27 and 29 and these eye bolts are connected by a ring 30 to which is adapted to be secured the neck yoke chain of the draft animal which is harnessed between the poles 21 and 22. The outer ends of the neck yokes 27 and 28 have mounted therein rings 31 and 32 respectively to which are adapted to be secured the neck yoke chains of the outermost draft animals respectively.

In use, the animals are attached one between the poles 21 and 22 and one on the outer side of each of said poles respectively. The animals thus positioned are secured to the neck yokes 27 and 28 in a manner heretofore referred to. As the short portions of the neck yokes are located on the outer sides of the poles 21 and 22 and the long portions thereof on the inner sides of said poles, and as said poles are adapted to move vertically relatively to each other it will be obvious that the strain or work in descending a hill will be equally divided between the three animals.

What is claimed is:

In a hold back draft equalizer, the combination with the front axle of a vehicle, of a stub tongue secured to and projecting forward from said axle, an evener beam pivoted at its center upon said stub tongue, poles pivotally secured to the ends of said evener beam respectively for movement in a vertical plane, a bar mounted on the forward end of said stub tongue for rotation in a vertical plane, link connections between each end of said bar and the adjacent pole, and a neck yoke pivotally mounted on the outer end of each pole the length of each neck yoke disposed inwardly and outwardly respectively of the pole upon which it is mounted being as two is to one.

In testimony whereof, I affix my signature, in presence of two witnesses.

SAMUEL W. PATNODE.

Witnesses:
WM. H. GORDON,
CLARENCE CASHMAN.

---

Copies of this patent may be obtained for five cents each, by addressing the "Commissioner of Patents, Washington, D. C."